United States Patent
Takada et al.

[19]

[11] Patent Number: 5,950,592
[45] Date of Patent: Sep. 14, 1999

[54] SPARK IGNITION TWO-CYCLE INTERNAL COMBUSTION ENGINE WITH SUB-COMBUSTION CHAMBER

[75] Inventors: Yoshihiro Takada; Yuji Tsushima; Yoshihide Namba; Minoru Ueda; Hiroshi Yamashita; Hiroshi Tanaka, all of Saitama, Japan

[73] Assignee: Honda Giken Kogyo Kabushiki Kaisha, Tokyo, Japan

[21] Appl. No.: 09/081,591

[22] Filed: May 20, 1998

[30] Foreign Application Priority Data

May 20, 1997 [JP] Japan ............................ 9-130119

[51] Int. Cl.$^6$ .......................................... F02B 21/02
[52] U.S. Cl. ................................. 123/257; 123/274
[58] Field of Search ......................... 123/288, 209, 123/210, 274, 310, 146.5 R, 638, 258, 260, 69 R, 27 R, 73 S, 197.1, 90.15, 73 C, 73 B, 73 A, 73 CA, 73 AB, 69 V, 257, 316

[56] References Cited

U.S. PATENT DOCUMENTS

| | | | |
|---|---|---|---|
| 2,121,920 | 6/1938 | Mallory | 123/274 |
| 2,156,665 | 2/1939 | Mallory | 123/274 |
| 3,877,444 | 4/1975 | Senga et al. | 123/274 |
| 3,929,115 | 12/1975 | Yamauti et al. | 123/310 |
| 3,937,188 | 2/1976 | Wrigley | 123/257 |
| 4,034,733 | 7/1977 | Noguchi et al. | 123/274 |
| 4,051,817 | 10/1977 | Hattori et al. | 123/490 |
| 4,064,850 | 12/1977 | Nakagawa et al. | 123/274 |
| 4,191,138 | 3/1980 | Jaulmes | 123/69 R |
| 4,248,183 | 2/1981 | Noguchi et al. | 123/69 R |
| 4,287,862 | 9/1981 | Noguchi et al. | 123/310 |
| 4,300,506 | 11/1981 | Knapp et al. | 123/311 |
| 4,742,804 | 5/1988 | Suzuki et al. | 123/310 |
| 4,838,213 | 6/1989 | Gerace | 123/288 |
| 5,080,060 | 1/1992 | Huang et al. | 123/257 |
| 5,081,969 | 1/1992 | Long, III | 123/274 |
| 5,713,317 | 2/1998 | Yoshioka | 123/90.15 |
| 5,803,039 | 9/1998 | Pien | 123/197.1 |

FOREIGN PATENT DOCUMENTS

| | | | |
|---|---|---|---|
| 144248 | 8/1935 | Austria | 123/209 |
| B2-2515276 | 4/1996 | Japan . | |
| 8500854 | 2/1985 | WIPO . | |

*Primary Examiner*—Noah P. Kamen
*Assistant Examiner*—Jason P. Benton
*Attorney, Agent, or Firm*—Birch, Stweart, Kolasch & Birch, LLP

[57] ABSTRACT

A highly efficient spark ignition two-cycle internal combustion engine is provided which assures stable and excellent combustion over a wider operation region of the engine. The spark ignition two-cycle internal combustion engine includes a sub-combustion chamber, and a pressure accumulating chamber which is filled with compressed air. A switching valve is arranged for communicating the pressure accumulating chamber with the sub-combustion chamber. A fuel injecting device injects fuel into the pressure accumulating chamber. A control device controls the operations of the switching valve and the fuel injecting device.

27 Claims, 9 Drawing Sheets

SPARK IGNITION TWO-CYCLE INTERNAL COMBUSTION ENGINE WITH SUB-COMBUSTION CHAMBER

BACKGROUND OF THE INVENTION

1. Field of the Invention

The present invention relates to a high efficiency spark ignition two-stroke cycle internal combustion engine which assures stable and excellent combustion over a wider engine operating region, and provides a lowered amount of hydrocarbon in the exhaust.

2. Description of the Background Art

In general, a two-cycle internal combustion engine executes twice the combustion in the same number of revolutions as a four-cycle internal combustion engine. The two-cycle engine thereby obtains almost twice the output as a four-cycle engine for the same stroke and volume. Therefore, the two-cycle internal combustion engine can provide a high output even with a small size, and it can be manufactured at a low cost with a small number of parts. As a result, the two-cycle engine is particularly suited for powering for vehicle. However, since exhaustion and scavenging in the two-cycle engine are executed simultaneously at a certain period, blow-by is easily generated, and a large amount of hydrocarbon is exhausted. Further, fuel consumption is bad.

An internal combustion engine described in Japanese Patent No. 2,515,276 has solved the problem explained above. In this internal combustion engine, a sub-combustion chamber is provided, and a fuel holding apparatus is provided adjacent to the sub-combustion chamber. The fuel holding chamber of the fuel holding apparatus is always filled with pressurized air compressed up to a predetermined pressure. A predetermined amount of fuel is supplied from a fuel metering apparatus corresponding to the operating condition of the internal combustion engine for a single revolution of the crankshaft. A switching valve of the fuel holding apparatus is opened at the predetermined crank angle and the predetermined amount of fuel in the fuel holding chamber is injected into the sub-combustion chamber together with the compressed air.

In the internal combustion engine explained above, since the fuel holding apparatus is provided adjacent to the sub-combustion chamber, the fuel holding apparatus is subjected to a high temperature. High temperature fuel in the fuel holding apparatus is carbonized when it is in contact with the aperture of the switching valve, and thereby soot adheres to the aperture.

Moreover, a switching valve is provided at the bottom part of the fuel holding chamber. When the switching valve is closed, the fuel collects at the bottom part of the fuel holding chamber. Therefore, when the switching valve is opened, the fuel collected in the bottom part of the fuel holding chamber is released into the sub-combustion chamber. As a result, the highly concentrated mixed air is easily exhausted from an exhaustion hole in the initial condition of the opening of the switching valve. The ability to control the exhaustion of hydrocarbon is lowered, and sufficient improvement of fuel consumption cannot be expected. This tendency is particularly great during a high output condition of the engine.

SUMMARY OF THE INVENTION

The present invention relates to a spark ignition two-cycle internal combustion engine with a sub-combustion chamber. The engine includes a pressure accumulating chamber which is filled with compressed air. A switching valve connects the pressure accumulating chamber to sub-combustion chamber. A fuel injecting means injects fuel into the pressure accumulating chamber. A control means controls the connection timing of the pressure accumulating chamber and the sub-combustion chamber by opening the switching valve preset corresponding to each amount of variation of engine operation such as the number of revolutions and the load of the engine. The communication timing of the pressure accumulating chamber and the sub-combustion chamber is longer than the fuel injection timing.

The closed switching valve is opened at the preset communication timing corresponding to an amount of variation of operation of the internal combustion engine. First, the compressed air in the pressure accumulating chamber is released, and the compressed air in the pressure accumulating chamber is injected to the sub-combustion chamber to supply the air into the sub-combustion engine. Simultaneously, the gas which has burned in the sub-combustion chamber is exhausted to the main combustion chamber, and thereby the main combustion chamber is sufficiently scavenged without the generation of blow-by. The fuel is injected into the sub-combustion chamber by the fuel injecting means at the preset injection timing corresponding to an amount of variation of operation of the internal combustion engine, and thereby the thick mixed air is supplied to the main combustion chamber from the sub-combustion chamber. As a result, the air is supplied in the form of a layer in the main combustion chamber to assure stable and good combustion over a wide loading region from a low load to a high load and for a wide operating region from a low speed to a high speed operation. Accordingly, sufficient hydrocarbon exhaustion control can be obtained, and fuel consumption can be improved remarkably.

The present invention stops fuel injection from the fuel injecting means to the pressure accumulating chamber at the cutoff timing preset corresponding to the amount of variation of operation of the internal combustion engine, and closes the switching valve at the injection stop timing preset corresponding to amount of variation of operation of the internal combustion engine. As a result, combustion in the pressure accumulating chamber is prevented so as to prevent adhesion of soot on the internal wall of the pressure accumulating chamber, and a constricting condition at the aperture of the switching valve by soot can be eliminated.

According to the present invention, the fuel injected from the fuel injecting means is sufficiently mixed with the compressed air in the pressure accumulating chamber to assure excellent combustion, and the fuel never adheres to the external surface of the fuel injecting means due to the flow of compressed air. Accordingly, the deposition of soot onto the external surface of the fuel injecting means can also be prevented.

The mixed air flowing to the sub-combustion chamber from the pressure accumulating chamber is sequentially in contact with a plurality of igniting means, or flows near such igniting means. As a result, if the mixed air is in the condition that it is not easily fired, the mixed air can surely be fired. Therefore, deterioration of fuel consumption by misfiring can be prevented, and an increase of exhaustion of hydrocarbon can be prevented. Moreover, comparatively high pressure compressed air can be obtained even under the low speed operating conditions, and various effects can be assured even in any operating condition.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

A preferred embodiment of the present invention shown in FIG. 1 will be explained below.

A spark ignition two-cycle internal combustion engine 1 for installation on a scooter type motorcycle (not illustrated) includes a crankcase 2, a cylinder block 3, and a cylinder head 4 integrally coupled together.

A crankshaft 5 is rotatably supported by the crankcase 2. A piston 7 is slidably coupled within a cylinder bore 6 of the cylinder block 3. The piston 7 and the crankshaft 5 are mutually coupled via a connecting rod 10. The crankshaft 5 is rotatably driven with vertical movement of the piston 7.

An air cleaner 13 is connected to the crank chamber 11 in the crankcases via an air feeding path 12. The air feeding path 12 is provided with a throttle valve 14, a fuel injecting valve 15 and a reed valve 16 from the upstream side to the downstream side. When the pressure in the crank chamber 11 becomes lower than atmospheric pressure when the piston 7 rises, air is sucked into the air feeding path 12 through the air cleaner 13 and is mixed with the fuel particles injected by the fuel injecting valve 15. The fuel-air mixture is then supplied to the crank chamber 11 via the reed valve 16.

A sub-combustion chamber 18 is formed in the cylinder head 4 in such a manner that it is adjacent to the main combustion chamber 17 and the upper part of the cylinder hole 6. A direct injection electromagnetic valve 19 is provided at the upper end of the sub-combustion chamber 18. A pressure accumulating chamber 20 of the direct injection electromagnetic valve 19 is communicated with a surge tank 22 via an air pipe 21. The surge tank 22 is connected to an exhaust port 24b of a double-operation reciprocal air pump 24 via an air pipe 23. An inlet port 24a of the reciprocal air pump 24 is connected to the air cleaner 13 via an air pipe 25. A cutoff valve 26 is provided in the air pipe 25.

The reciprocal air pump 24 is mechanically coupled with the crankshaft 5. When the crankshaft 5 is rotated, the reciprocal air pump 24 operates so that the air from the air cleaner 13 is compressed and is then supplied to the surge tank 22, and the compressed air in the surge tank 22 is then supplied to fill the pressure accumulating chamber 20.

An air returning pipe 27 is connected to the air pipe 23 in parallel with the air pipe 25. An air pressure adjusting valve 28 is provided in the air returning pipe 27. When the air pressure in the surge tank 22 becomes higher than the atmospheric pressure by a preset value, the compressed air in the surge tank 22 returns to the air cleaner 13, and the air pressure in the surge tank 22 is held at the pressure preset by the air adjusting valve 28.

A fuel pump 29 is mechanically coupled with the crankshaft 5. An outlet port 29b of the fuel pump 29 is connected to a fuel injecting valve 34 and the fuel injecting valve 15 via a fuel pipe 33. The fuel injecting valve 34 is provided to the pressure accumulating chamber 20. When the crankshaft 5 rotates, the fuel pump 29 is driven to supply the fuel in a fuel tank 31 to the fuel injecting valves 15, 34.

A fuel returning pipe 35 is connected to the fuel pipe 33 in parallel with the fuel pipe 33. A fuel pressure adjusting valve 36 is provided in the fuel returning pipe 35. When the fuel pressure in the fuel pipe 33 becomes higher than the air pressure in the surge tank 22 by a preset pressure value, the fuel in the fuel pipe 33 returns to the fuel tank 31, and the fuel pressure in the fuel pipe 33 is held at the pressure preset by the fuel pressure adjusting valve 36.

A lubricant pump 37 is mechanically coupled with the crankshaft 5. An inlet port 37a of the lubricant pump 37 is connected to a lubricant tank 39 via a lubricant pipe 38. An outlet port 37b of the lubricant pump 37 is connected to the cylinder wall where the sliding piston is located via a lubricant supply pipe 40. A lubricant control valve 41 is provided in the lubricant supply pipe 40. When the crankshaft 5 rotates, the lubricant pump 37 is driven to supply lubricant in an amount preset by a lubricant control valve 41 to the sliding part of the engine 1.

An electronic control apparatus 42 is additionally provided to the spark ignition two-cycle internal combustion engine 1. The electronic control apparatus 42 uses a battery 43 as the power supply. The electronic control apparatus 42 receives input signals from an Ne sensor 44 to detect the number of rotations of crankshaft 5, a crank angle sensor 45 to detect the crank angle, a $\theta_{th}$ sensor 46 to detect an opening of a throttle, a $T_A$ sensor 47 to detect the air, a $P_B$ sensor 48 to detect the inlet pressure downstream of the throttle valve 14, and a Tw sensor 49 to detect the temperature of cooling water of the engine.

The sub-combustion chamber 18 is also provided with spark plugs 50, 51 in the upstream and downstream sides thereof. The spark plugs 50, 51 are respectively provided with ignition coils 52, 53.

An output terminal of the electronic control apparatus 42 is respectively connected to the fuel injecting valves 15, 34, the ignition coils 52, 53, the direct injection electromagnetic valve 19, the cutoff valve 26 and the lubricant control valve 41.

Figure 2:
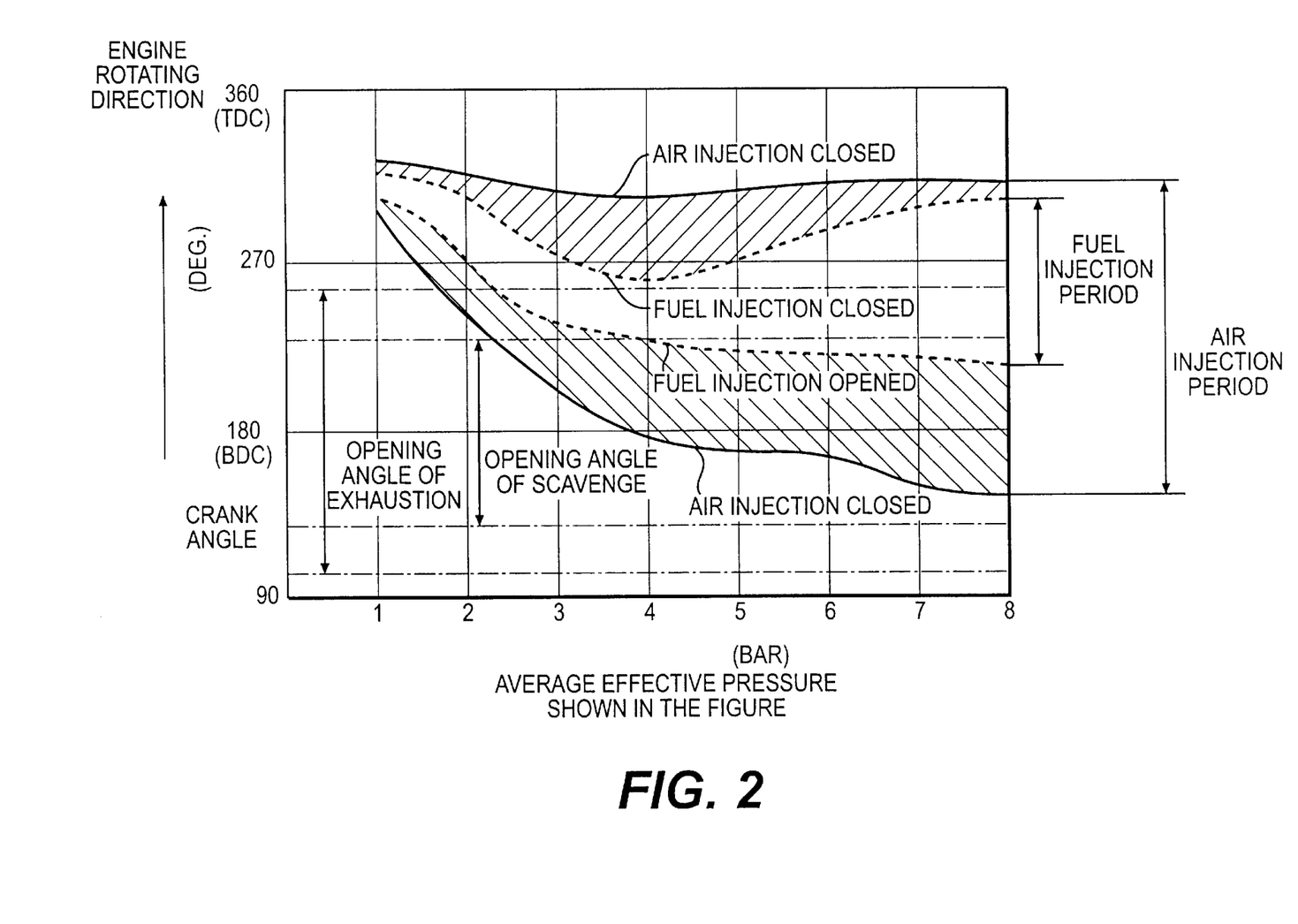
FIG. 2 is a characteristic diagram showing the compressed air and fuel injection timing in the embodiment of FIG. 1 verses a change of the average effective pressure shown in the figure.

The direct injection electromagnetic valve 19 is opened and closed with a control signal from the electronic control apparatus 42 at a crank angle timing indicated by a solid line in FIG. 2 corresponding to the average effective pressure PMI shown in the figure, which shows a variation of operation of the engine. The formula for calculating the average effective pressure is PMI=K*W/Ne*Vst, where W is output, Ne is the number of rotations of crankshaft, Vst is the displacement of the engine, K is a proportional constant. The fuel injecting valve 34 is also controlled to start or complete the injection at the crank angle timing shown by a broken line in FIG. 2 with the control signal from the electronic control apparatus.

The spark plugs 50, 51 are also operated at the required timings (which are matched) corresponding to the average effective pressure PMI shown in the figure with the control signal from the electronic control apparatus 42 to generate the spark.

The operation timing of the direct injection electromagnetic valve 19 and the fuel injecting valve 34 is delayed in average from the scavenge hole opening period and exhaustion hole opening period as shown in FIG. 2 in the idling condition where the average effective pressure PMI is almost 1 and its operating period is also short.

As an output of the engine 1 increases and thereby the average effective pressure PMI increases up to 2, 3 and 4 (bar), the operation period of the fuel injecting valve 34 increases, and the operation period of the direct injection electromagnetic valve 19 increases even more than the increase of the fuel injecting valve 34 timing.

As shown in FIG. 2, the timing for starting the opening of the direct injection electromagnetic valve 19 is almost linearly increased to a large extent while the average effective pressure PMI shown in the figure changes from 1 bar to 4 bar. On the other hand, the timing is gradually increased while the PMI changes from 4 bar to 6 bar. Thereafter, timing becomes almost constant when the PMI exceeds 7 bar. Moreover, the opening period of the direct injection electromagnetic valve 19 increases greatly while the PMI changes from 1 bar to 4 bar, while a rate of increase is lowered while the PMI changes from 4 bar to 6 bar. When the PMI changes from 6 bar to 7 bar, a rate of increase is temporarily increased and thereafter it becomes almost constant.

The injection period of the fuel injecting valve 34 largely increases as the average effective pressure PMI shown in FIG. 2 changes from 1 bar to 2 bar, but it becomes almost constant while the PMI changes from 2 bar to 4 bar. Moreover, when the PMI exceeds 4 bar, it does not change rapidly like between 1 bar to 2 bar, but it changes gradually.

The timing of injection of the fuel injecting valve 34 is quickened in almost half the rate of the opening timing of the direct injection electromagnetic valve 19, while the PMI changes from 1 bar to 4 bar. When the PMI exceeds 4 bar, the timing becomes almost constant.

As explained above, since the direct injection electromagnetic valve 19 is opened to inject the compressed air from the pressure accumulating chamber 20 to the sub-combustion chamber 18, prior to the injection of fuel from the fuel injecting valve 34 to the pressure accumulating chamber 20 for the entire operation range of the engine 1, the gas which has burnt to fill the sub-combustion chamber 18 is pushed toward the main combustion chamber 17. The sub-combustion chamber 18 is thereafter filled with the air and the fuel injected later from the fuel injecting valve 34 to form the layered air supply in the sub-combustion chamber 18 and main combustion chamber 17. As a result, the mixed air is positively fired by the spark plugs 50, 51 to prevent misfiring.

Moreover, under the high load operating condition where the average effective pressure PMI shown in FIG. 2 is high, even if the injection timing of the fuel injecting valve 34 is quickened, the direct injection electromagnetic valve 19 is opened quicker than the injection timing of the fuel injecting valve 34 and the compressed air is injected from the pressure accumulating chamber 20 to the sub-combustion chamber 18. Thereby, exhaustion of the burning gas in the main combustion chamber 17 is promoted and the amount of gas to be newly supplied to the main combustion chamber 17 increases. Accordingly, an output is easily increased and a stable burning condition can be assured. As a result, as shown in X of FIG. 3, exhaustion of hydrocarbon is reduced and fuel consumption can be improved in comparison with exhaustion of hydrocarbon of the existing internal combustion engine A, an internal combustion engine B with a sub-combustion chamber, and an internal combustion engine C with a sub-combustion chamber.

Moreover, since only the air is supplied to the sub-combustion chamber 18 via the pressure accumulating chamber 20 after the fuel is supplied to the sub-combustion chamber 18 via the pressure accumulating chamber 20 from the fuel injecting valve 34 for the entire operation range of the engine 1, adhesion of fuel to the surfaces of the high temperature pressure accumulating chamber 20 and sub-combustion chamber 18 and to the surfaces of the spark plugs 50, 51 can be prevented. Thereby adhesion of soot to these surfaces can also be prevented, eliminating the constricted condition. In addition, maintenance work of the engine 1 can be simplified and excellent operating condition can be maintained.

Another embodiment of the present invention is shown in FIG. 4 to FIG. 7. A spark ignition two-cycle internal combustion engine 60 having a sub-combustion chamber 60 is integrally assembled into a swing power unit O of a scooter type motorcycle (not illustrated) together with a V-belt continuously variable transmission 62. A cylinder head 64 is integrally coupled to an upper part of a cylinder block 63 of the engine 61. A left crankcase 65 and a right crankcase 66 are divided into right and left portions and are integrally coupled to the lower portion of the cylinder block 63.

Figure 4:
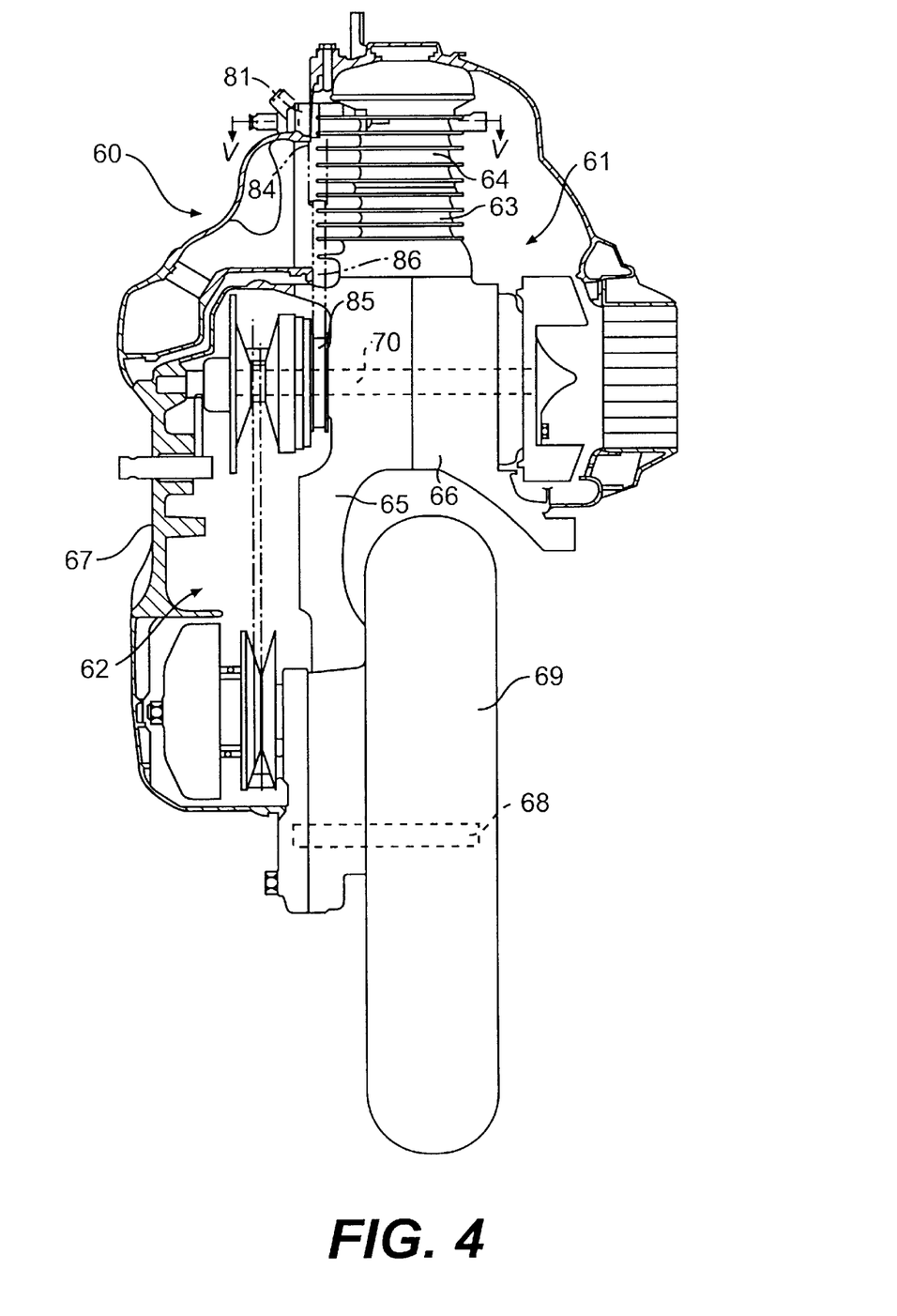
FIG. 4 is a schematic plan view of the embodiment further embodying the embodiment of FIG. 1.

The left crankcase 65 is extended in a rearward direction, and a transmission case 67 is removably connected at the left outer side of the left crankcase 65. Together, the transmission case 67 and the left crankcase 65 form a case for the V-belt continuously variable transmission 62. A rear wheel 69 is integrally fixed to a wheel shaft 68 acting as an output shaft of the V-belt continuously variable transmission 62, and thereby the power of a crankshaft 70 supported by the left crankcase 65 and the right crankcase 66 is transferred to the rear wheel 69 via the V-belt continuously variable transmission 62.

Figure 3:
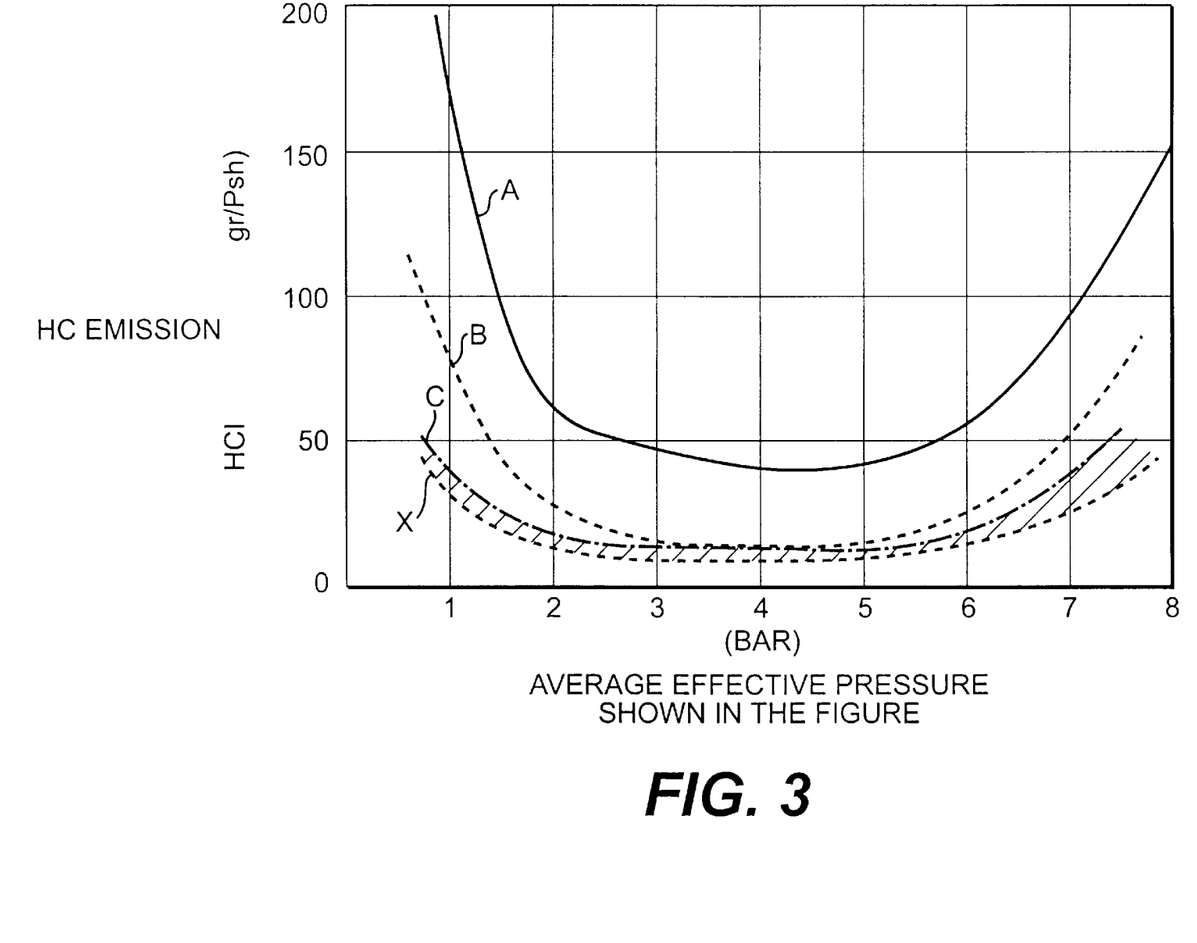
FIG. 3 is a characteristic diagram showing exhaustion of hydrocarbon of the embodiment shown in FIG. 1 and exhaustion of hydrocarbon of the existing internal combustion engine depending on a change of the average effective pressure shown in the figure.

As shown in FIG. 3, a piston 72 is slidably engaged with a cylinder bore 71 of the cylinder block 63 in the spark ignition two-cycle internal combustion engine 61. Both ends of a connecting rod 75 are rotatably pivoted to a piston pin 73 of the piston 72 and a crank pin 74 of the crankshaft 70.

The crankshaft 70 is rotatably driven with vertical movement of the piston 72.

A sub-combustion chamber 77 is formed in the cylinder head 64 adjacent to the main combustion chamber 76 at the upper part of the cylinder bore 71.

The sub-combustion chamber 77 communicates with the main combustion chamber 76, and is made of iron materials such as steel.

A mixed gas electromagnetic injection valve 78 is provided at the upper end of the sub-combustion chamber 77. A compressed air path 80 is formed toward the center of the pressure accumulating chamber 79 of the mixed gas injection electromagnetic valve 78. A fuel injecting valve 81 is attached on the line extending externally from the center of the compressed air path 80.

Figure 5:
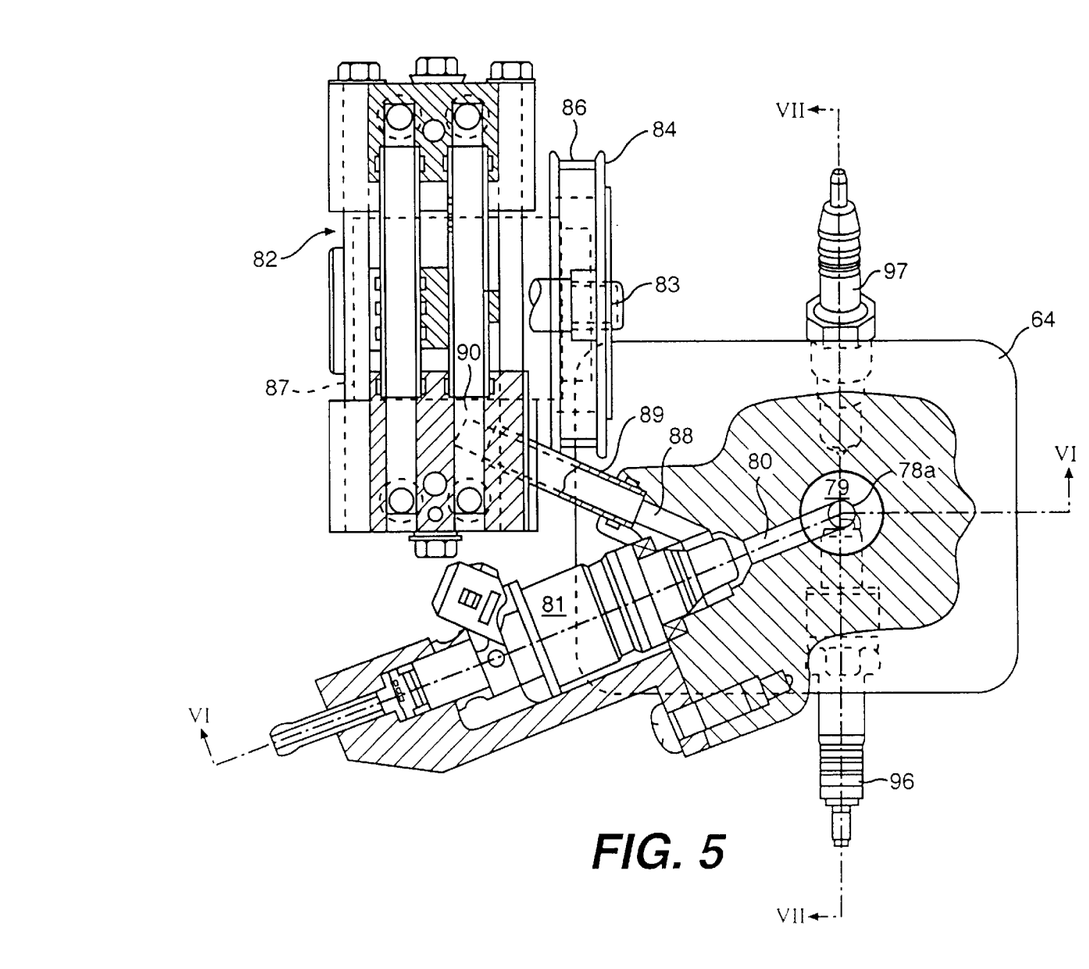
FIG. 5 is a cross-sectional view taken along line V—V of FIG. 4.
Figure 6:
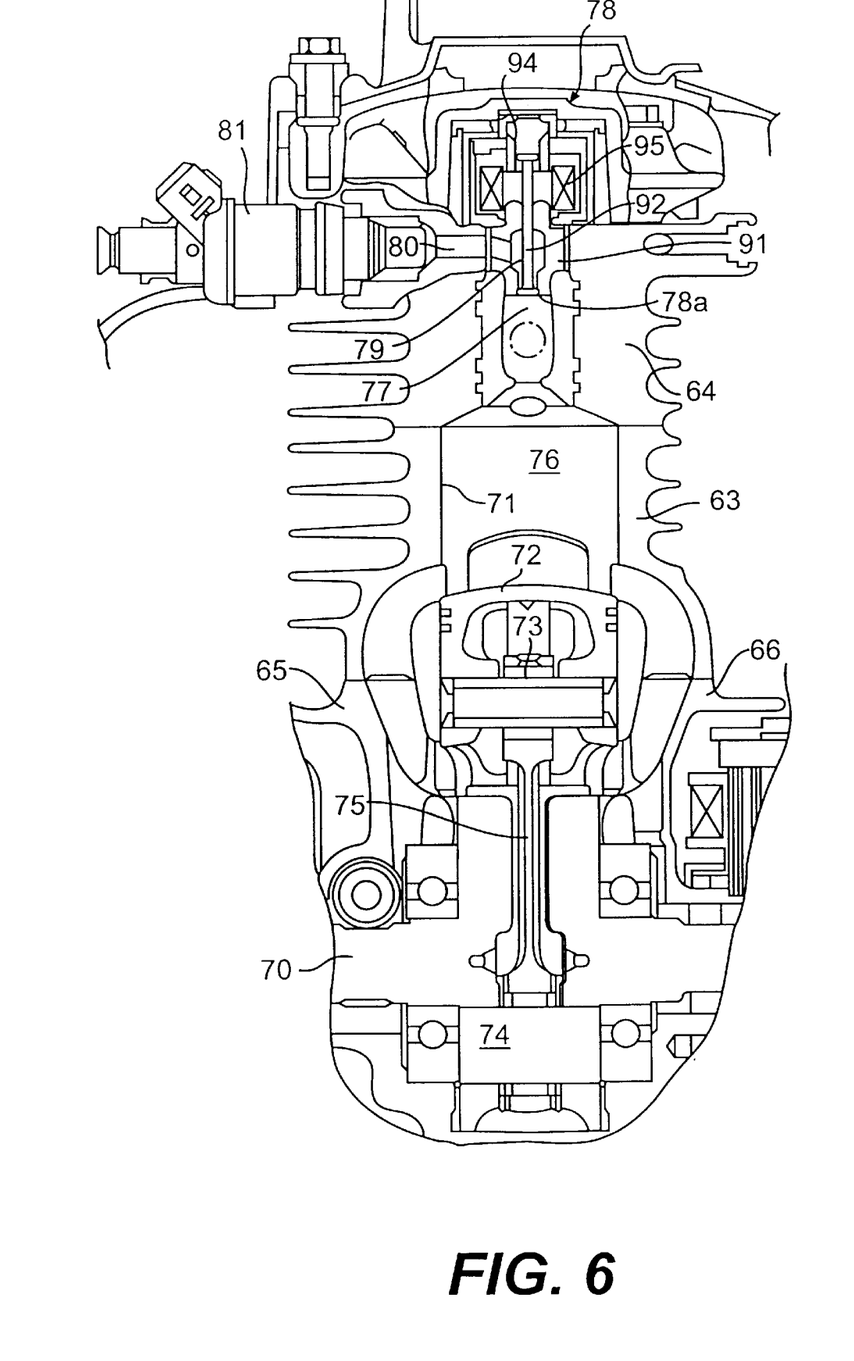
FIG. 6 is a vertical cross-sectional view taken along line VI—VI of FIG. 5.
Figure 7:
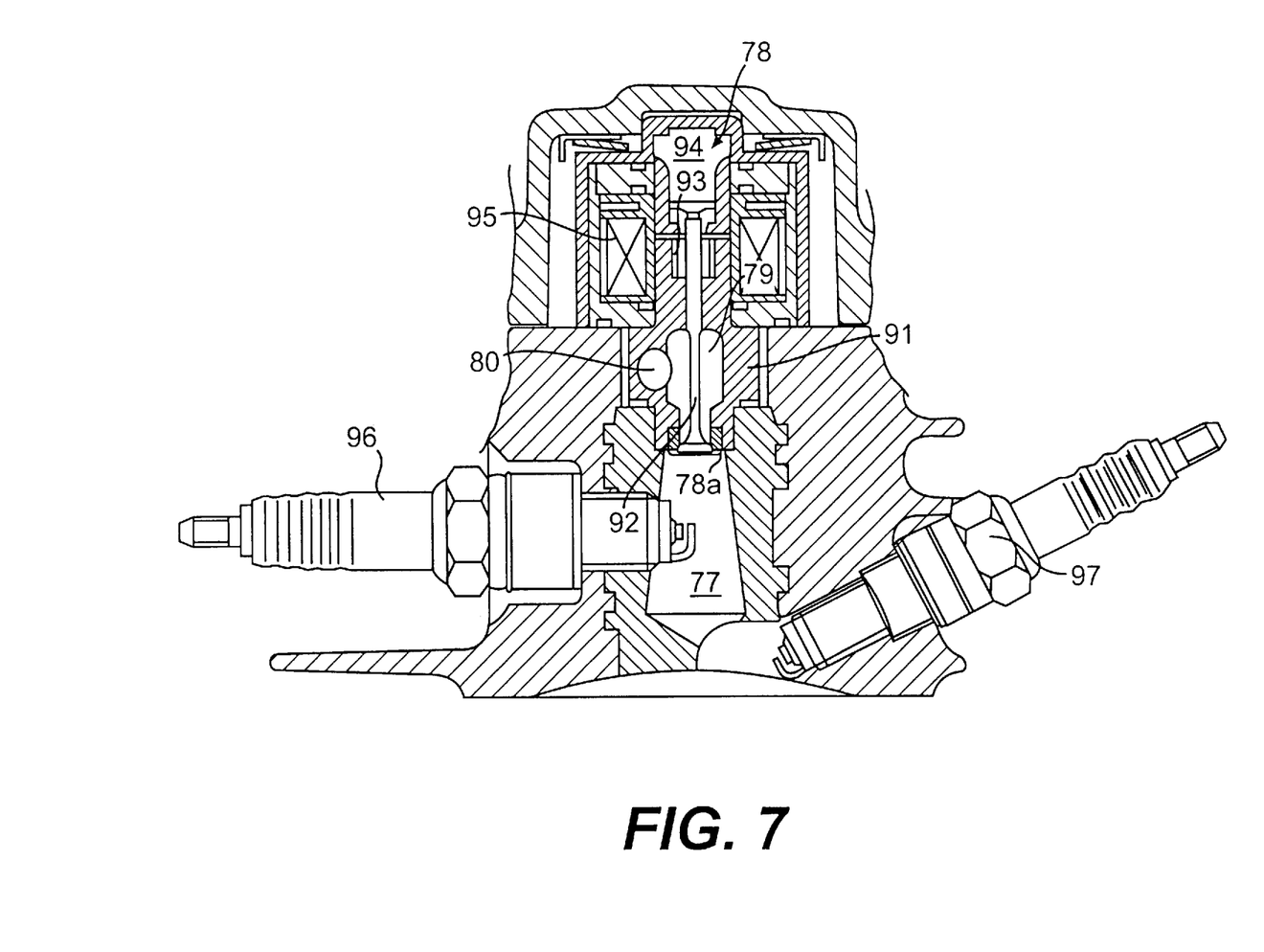
FIG. 7 is a vertical cross-sectional view taken along line VII—VII of FIG. 5.

As shown in FIG. 5, a reciprocating air pump 82 is attached to the cylinder head 64. A driven pulley 84 is engaged with the right end of a crankshaft 83 of the reciprocating air pump 82. A drive pulley 85 is engaged, as shown in FIG. 4, with the crankshaft 70 of the engine 60. A belt 86 is extended over the driven pulley 84 and the drive pulley 85. When the crankshaft 70 rotates, the crankshaft 83 of the reciprocating air pump 82 is driven to rotate.

In the reciprocating air pump 82, the piston (not illustrated) in the cylinder 87 of the reciprocating air pump 82 is driven to reciprocate with rotation of the crankshaft 83.

As shown in FIG. 5, a compressed air path 88 is formed in the cylinder head 64 in the direction crossing the end part of the fuel injecting valve 81. One end of a communication pipe 89 is engaged with the compressed air path 88 along the extending line of the compressed air path 88. The other end of the communication pipe 89 is communicated with a discharge chamber 90 of the reciprocating air pump 82. The air compressed by the reciprocating air pump 82 is supplied from the discharge chamber 90 to the pressure accumulating chamber 79 via the communication pipe 89, the compressed air path 88 and the compressed air path 80.

When the direct injection electromagnetic valve 78 is opened and the fuel injecting valve 81 is operated, the fuel is injected by the fuel injecting valve 81 to the compressed air flowing toward the pressure accumulating chamber 79 at a high speed via the compressed air path 80. The air and fuel are mixed, and the fuel-air mixture is forcibly supplied to the sub-combustion chamber 77 from the opening 78a of the direct injection electromagnetic valve 78.

The direct injection electromagnetic valve 78 is composed of a valve casing 91, a poppet valve body 92 which is slidably engaged with the valve casing 91 to open or close the aperture 78a of the direct injection electromagnetic valve 78, a coil spring 93 to activate the poppet valve body 92 in the direction to close the aperture 87a of the direct injection electromagnetic valve 78, a magnetic attracting member 94 engaged with one end of the top end of the poppet valve body 92, and an electromagnetic coil 95 to attract the attracting member 94 to the lower side during operation to open the direct injection electromagnetic valve 78. When the power is supplied to the electromagnetic coil 95, the direct injection electromagnetic valve 78 which has been closed is then opened.

Spark plugs 96, 97 are arranged at the upstream side and downstream side in the sub-combustion chamber 77. These spark plugs 96, 97 are operated simultaneously or in sequence by shifting the timing, with spark plug 96 firing prior to spark plug 97.

Figure 1:
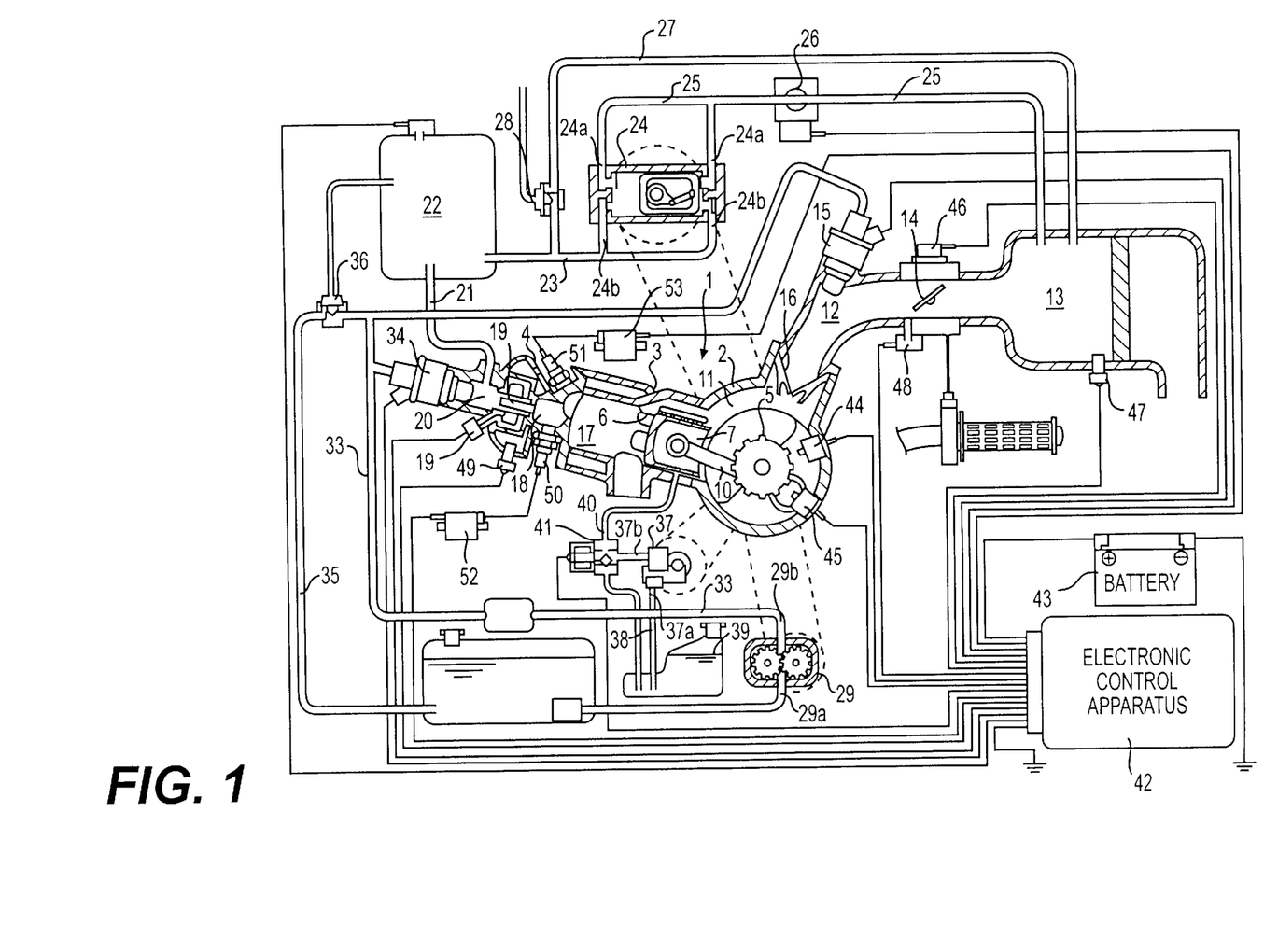
FIG. 1 is a schematic diagram showing a preferred embodiment of the two-cycle internal combustion engine with a sub-combustion chamber of the present invention.

The remaining portions of the embodiment shown in FIG. 4 to FIG. 7 is structured in the same manner as the embodiment of FIG. 1. Therefore, the operation similar to that of the embodiment of FIG. 1 is performed and similar effects can also be obtained.

Since the sub-combustion chamber 77 of this embodiment itself is formed of an iron-based material, while the body of the ambient internal combustion engine 60 is formed of aluminum alloy, the sub-combustion chamber 77 assures an excellent heat maintaining property. This contributes to the prevention of adherence of fuel to the interior surface of the sub-combustion chamber 77.

Figure 8:
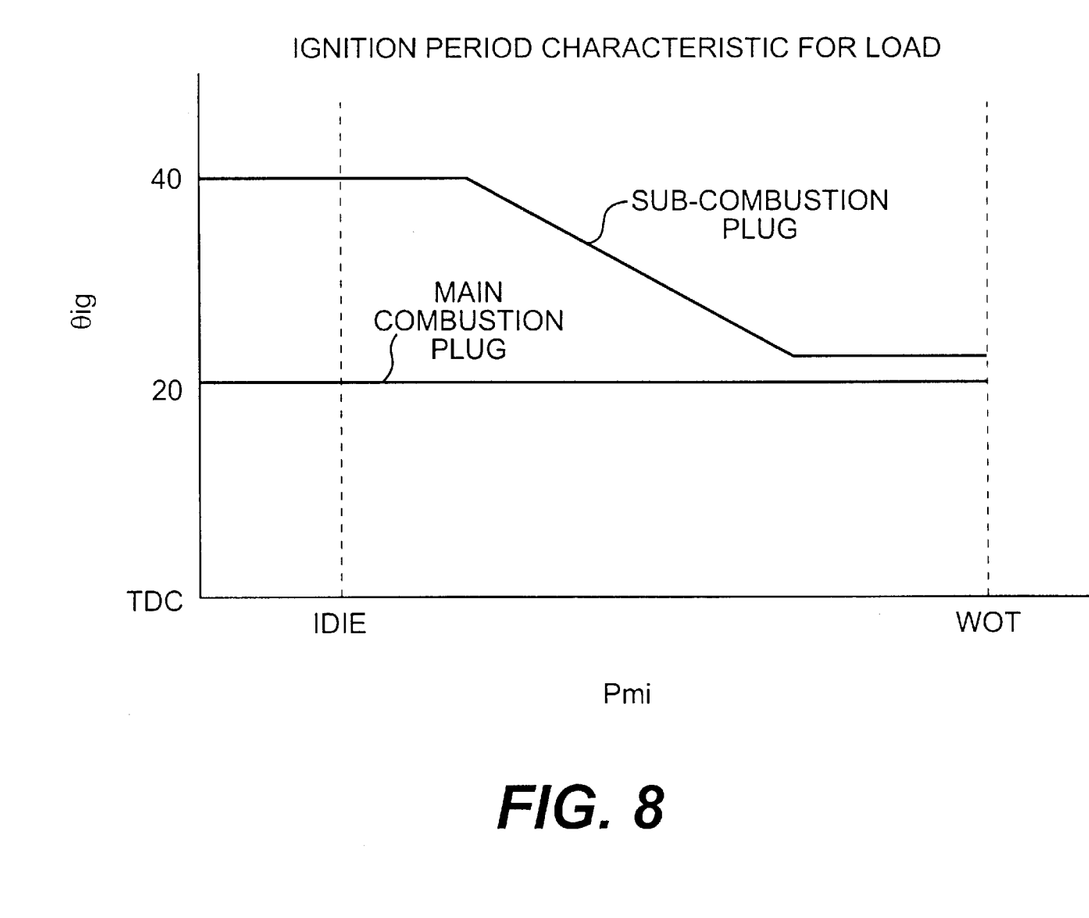
FIG. 8 is a characteristic diagram showing the difference in the ignition timings of the spark plugs in the embodiment shown in FIG. 4 to FIG. 7.

In the embodiment shown in FIG. 4 to FIG. 7, if difference is given to the ignition timings of the spark plugs 96, 97 as shown in FIG. 8, combustion is remarkably improved for the entire range of load of the engine.

Figure 9:
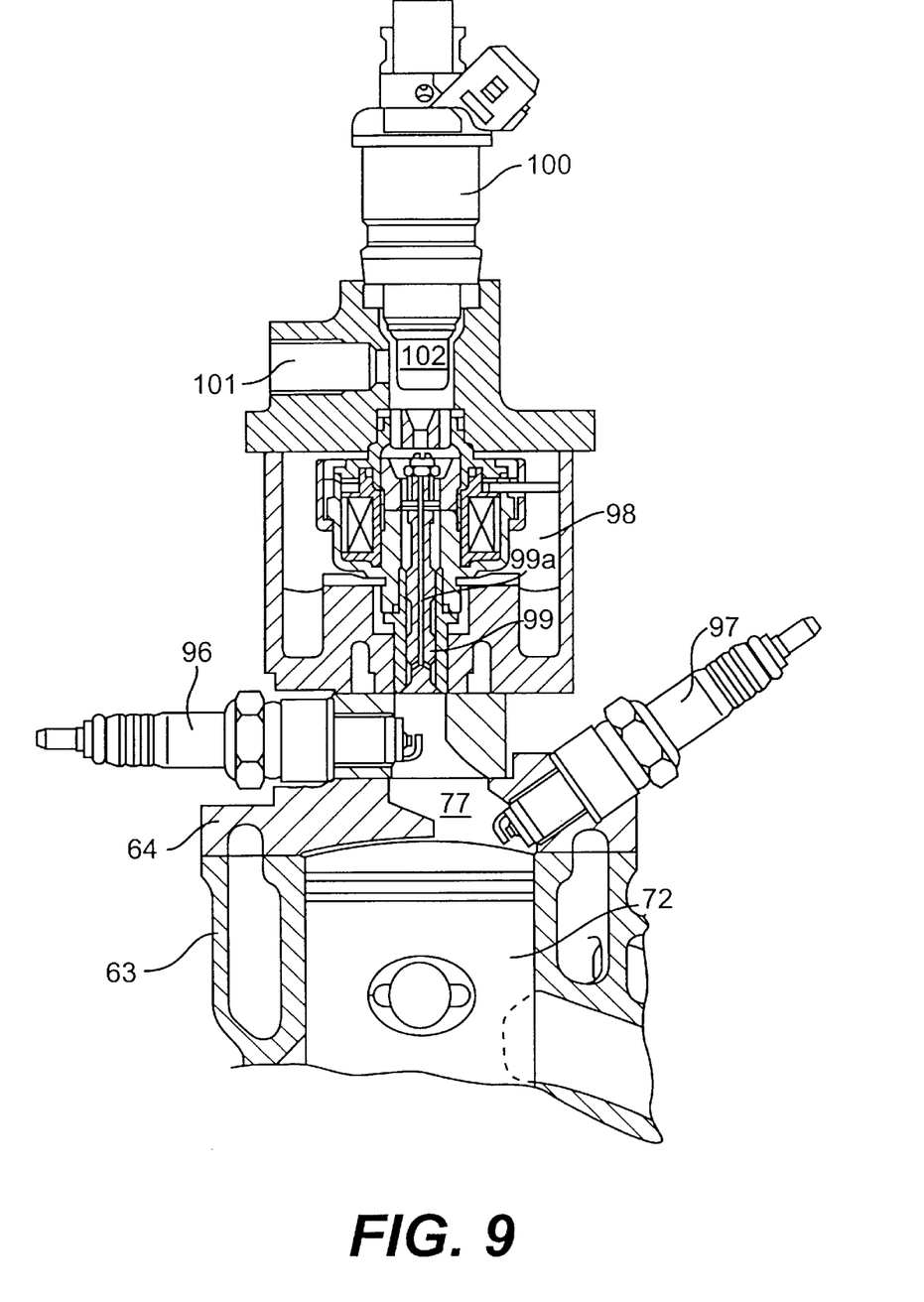
FIG. 9 is a vertical cross-sectional view of a second embodiment of the present invention.

FIG. 9 shows a direct injection electromagnetic valve 98 having a modified structure in which adhesion of fuel in the direct injection electromagnetic valve 98 can be prevented more reliably because a mixed air path 99a is formed at the center of a poppet valve body 99 of the direct injection electromagnetic valve 98. A fuel injecting valve 100 is arranged on the line extending from the mixed air path 99a. A compressed air path 101 is formed to cross orthogonally to the extending line from the mixed air path 99a in a pressure accumulating chamber 102. The fuel injected from the fuel injecting valve 100 passes through the pressure accumulating chamber 102 and along the mixed air path 99a of the poppet valve body 99.

The invention may be applied to various types of engines other than a spark ignition two-cycle engine. For example, the invention may be utilized with a four-cycle engine, or with a diesel-type self-ignition engine which does not utilize a spark for igniting the fuel mixture.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A spark ignition two-cycle internal combustion engine with a sub-combustion chamber comprising:

a pressure accumulating chamber which is filled with compressed air;

a switching valve for selectively communicating the pressure accumulating chamber to the sub-combustion chamber;

fuel injecting means for injecting fuel into the pressure accumulating chamber; and control means for controlling a communication timing of the pressure accumulating chamber to the sub-combustion chamber by opening the switching valve, the communication timing being preset corresponding to variations in engine operation, whereby the communication timing is controlled to occur before the injection timing.

2. The spark ignition two-cycle internal combustion engine according to claim 1, wherein the variations in engine operation are variations in the revolution rate and load of the engine.

3. The spark ignition two-cycle internal combustion engine according to claim 1, wherein the fuel injecting means is arranged so that the compressed air in the pressure accumulating chamber is in contact with an injection end of the fuel injecting means.

4. The spark ignition two-cycle internal combustion engine according to claim 1, wherein a plurality of igniting means for igniting a fuel-air mixture are arranged within the sub-combustion chamber along a direction in which the fuel-air mixture flows in the sub-combustion chamber.

5. The spark ignition two-cycle internal combustion engine according to claim 1, wherein the pressure accumulating chamber is filled with compressed air by means of a reciprocating air pump coupled to a crankshaft of the internal combustion engine.

6. A spark ignition two-cycle internal combustion engine with a sub-combustion chamber comprising:
   a pressure accumulating chamber which is filled with compressed air;
   a switching valve for selectively communicating the pressure accumulating chamber to the sub-combustion chamber;
   fuel injecting means for injecting fuel into the pressure accumulating chamber; and
   control means for controlling a cutoff timing of the pressure accumulating chamber to the sub-combustion chamber by closing the switching valve, the cutoff timing being preset corresponding to variations in engine operation, said control means also controlling an injection stop timing for stopping fuel injection from the fuel injecting means into the pressure accumulating chamber,
   whereby the injection stop timing is controlled to occur before the cutoff timing.

7. The spark ignition two-cycle internal combustion engine according to claim 6, wherein the variations in engine operation are variations in the revolution rate and load of the engine.

8. The spark ignition two-cycle internal combustion engine according to claim 6, wherein the fuel injecting means is arranged so that the compressed air in the pressure accumulating chamber is in contact with an injection end of the fuel injecting means.

9. The spark ignition two-cycle internal combustion engine according to claim 6, wherein a plurality of igniting means for igniting a fuel-air mixture are arranged within the sub-combustion chamber along a direction in which the fuel-air mixture flows in the sub-combustion chamber.

10. The spark ignition two-cycle internal combustion engine according to claim 6, wherein the pressure accumulating chamber is filled with compressed air by means of a reciprocating air pump coupled to a crankshaft of the internal combustion engine.

11. A spark ignition two-cycle internal combustion engine with sub-combustion chamber comprising:
    a pressure accumulating chamber which is filled with compressed air;
    a switching valve for selectively communicating the pressure accumulating chamber to the sub-combustion chamber;
    fuel injecting means for injecting fuel into the pressure accumulating chamber; and
    control means for controlling a connection timing of the pressure accumulating chamber to the sub-combustion chamber by opening and closing the switching valve, the connection timing being preset corresponding to variations in engine operation, said control means also controlling an injection timing of the fuel injecting means for starting injection of fuel into the pressure accumulating chamber and for stopping injection of fuel into the pressure accumulating chamber,
    whereby a time period between opening and closing of the switching valve constitutes a connection period, a time period between starting and stopping of fuel injection constitutes a fuel injecting period, and the fuel injecting period is controlled to occur within the connection period.

12. The spark ignition two-cycle internal combustion engine according to claim 11, wherein the variations in engine operation are variations in the revolution rate and load of the engine.

13. The spark ignition two-cycle internal combustion engine according to claim 11, wherein the fuel injecting means is arranged so that the compressed air in the pressure accumulating chamber is in contact with an injection end of the fuel injecting means.

14. The spark ignition two-cycle internal combustion engine according to claim 11, wherein a plurality of igniting means for igniting a fuel-air mixture are arranged within the sub-combustion chamber along a direction in which the fuel-air mixture flows in the sub-combustion chamber.

15. The spark ignition two-cycle internal combustion engine according to claim 11, wherein the pressure accumulating chamber is filled with compressed air by means of a reciprocating air pump coupled to a crankshaft of the internal combustion engine.

16. A spark ignition two-cycle internal combustion engine comprising:
    a sub-combustion chamber;
    a pressure accumulating chamber for accumulating compressed air;
    a switching valve for selectively communicating the pressure accumulating chamber to the sub-combustion chamber;
    a fuel injector for injecting fuel into the pressure accumulating chamber; and
    a controller for controlling operation of the switching valve and the fuel injector to thereby control a communication timing of the pressure accumulating chamber to the sub-combustion chamber and an injection timing of fuel from the fuel injector into the pressure accumulating chamber.

17. A method of operating a spark ignition two-cycle internal combustion engine comprising the following steps:
    providing a spark ignition two-cycle internal combustion engine with a sub-combustion chamber;
    providing a pressure accumulating chamber for accumulating compressed air;
    providing a switching valve for selectively communicating the pressure accumulating chamber to the sub-combustion chamber;
    providing a fuel injector for injecting fuel into the pressure accumulating chamber; and
    controlling the switching valve and the fuel injector to thereby control a communication timing of the pressure accumulating chamber to the sub-combustion chamber and an injection timing of fuel from the fuel injector into the pressure accumulating chamber.

18. The method according to claim 17, wherein said step of controlling the switching valve and the fuel injector includes the steps of:
    opening the switching valve to communicate the pressure accumulating chamber to the sub-combustion chamber, and then
    injecting fuel into the pressure accumulating chamber.

19. The method according to claim 18, wherein said step of controlling the switching valve and the fuel injector further includes the steps of:

stopping injection of fuel into the pressure accumulating chamber, and then, closing the switching valve to close the pressure accumulating chamber from the sub-combustion chamber.

20. The spark ignition two-cycle internal combustion engine according to claim 1, wherein said control means is an electronic control device.

21. The spark ignition two-cycle internal combustion engine according to claim 6, wherein said control means is an electronic control device.

22. The spark ignition two-cycle internal combustion engine according to claim 11, wherein said control means is an electronic control device.

23. The spark ignition two-cycle internal combustion engine according to claim 16, wherein said controller is an electronic control device.

24. The spark ignition two-cycle internal combustion engine according to claim 1, said engine further comprising a main combustion chamber, wherein said main combustion chamber, said sub-combustion chamber, and said pressure accumulating chamber are aligned in a row, with said sub-combustion chamber located between said main combustion chamber and said pressure accumulating chamber along said row.

25. The spark ignition two-cycle internal combustion engine according to claim 6, said engine further comprising a main combustion chamber, wherein said main combustion chamber, said sub-combustion chamber, and said pressure accumulating chamber are aligned in a row, with said sub-combustion chamber located between said main combustion chamber and said pressure accumulating chamber along said row.

26. The spark ignition two-cycle internal combustion engine according to claim 11, said engine further comprising a main combustion chamber, wherein said main combustion chamber, said sub-combustion chamber, and said pressure accumulating chamber are aligned in a row, with said sub-combustion chamber located between said main combustion chamber and said pressure accumulating chamber along said row.

27. The spark ignition two-cycle internal combustion engine according to claim 16, said engine further comprising a main combustion chamber, wherein said main combustion chamber, said sub-combustion chamber, and said pressure accumulating chamber are aligned in a row, with said sub-combustion chamber located between said main combustion chamber and said pressure accumulating chamber along said row.

* * * * *